US009797522B1

(12) United States Patent
Del Real

(10) Patent No.: US 9,797,522 B1
(45) Date of Patent: Oct. 24, 2017

(54) FOLDABLE HANDLE FOR MANUALLY-OPERATED QUARTER-TURN VALVES

(71) Applicant: Scorpion Safety Handels, Bakersfield, CA (US)

(72) Inventor: Luis M. Del Real, Delano, CA (US)

(73) Assignee: SCORPION SAFETY HANDLES, Bakersfield, CA (US)

( * ) Notice: Subject to any disclaimer, the term of this patent is extended or adjusted under 35 U.S.C. 154(b) by 0 days.

(21) Appl. No.: 15/099,836

(22) Filed: Apr. 15, 2016

Related U.S. Application Data

(60) Provisional application No. 62/153,690, filed on Apr. 28, 2015.

(51) Int. Cl.
*F16K 35/02* (2006.01)
*F16K 31/60* (2006.01)
*F16K 5/08* (2006.01)

(52) U.S. Cl.
CPC ............... *F16K 35/02* (2013.01); *F16K 5/08* (2013.01); *F16K 31/602* (2013.01); *F16K 35/025* (2013.01)

(58) Field of Classification Search
CPC .......... F16K 5/08; F16K 31/602; F16K 35/02; F16K 35/022; F16K 35/025; F16K 35/027
USPC ...... 251/90, 91, 92, 93, 95, 98, 99; 137/383, 137/384.2, 384.8, 385; 74/547, 551.4, 74/551.5; 70/174, 175, 176
See application file for complete search history.

(56) References Cited

U.S. PATENT DOCUMENTS

| | | | | |
|---|---|---|---|---|
| 195,724 A | * | 10/1877 | Noyes | F16K 35/10 137/385 |
| 907,130 A | * | 12/1908 | Cramer | F16K 35/06 137/270 |
| 1,715,902 A | * | 6/1929 | Countryman | B66F 13/00 74/547 |
| 1,743,241 A | * | 1/1930 | Schmidt | B60K 20/02 403/102 |
| 2,231,323 A | * | 2/1941 | Cawood | A61G 17/02 74/547 |
| 3,311,128 A | * | 3/1967 | Taylor | F16K 1/2265 137/383 |
| D297,354 S | * | 8/1988 | Wirth | D23/245 |
| 5,014,528 A | * | 5/1991 | Roberts | F16K 35/06 137/385 |
| 5,183,073 A | * | 2/1993 | Roberts | F16K 5/0647 137/385 |
| 5,365,759 A | * | 11/1994 | Bonomi | F16K 35/06 137/385 |

(Continued)

*Primary Examiner* — Michael R Reid
*Assistant Examiner* — Jonathan Waddy
(74) *Attorney, Agent, or Firm* — James M. Duncan, Esq.; Klein DeNatale Goldner

(57) ABSTRACT

A valve handle for manually-operated quarter-turn valves, such as plug valves and ball valves, has two members which are hingedly attached, allowing an outwardly extending portion of the valve handle to be folded downwardly and against the valve body when the valve is in the closed position. A locking mechanism on the valve handle locks the handle in an operational position. When the lock is deactivated, the outwardly extending portion may be folded downwardly. The locking mechanism may have a clip portion which engages a stop on the valve body, which prevents the inadvertent opening of the valve when the outwardly extending portion is folded downwardly.

6 Claims, 4 Drawing Sheets

(56) References Cited

U.S. PATENT DOCUMENTS

| | | | |
|---|---|---|---|
| 7,513,484 B1 * | 4/2009 | Selby | B66D 3/02 254/243 |
| 2015/0101684 A1 * | 4/2015 | Yoder | F16K 35/10 137/385 |

* cited by examiner

FOLDABLE HANDLE FOR MANUALLY-OPERATED QUARTER-TURN VALVES

RELATED APPLICATION

U.S. Application No. 62/153,690 for this invention was filed on Apr. 28, 2015, for which application this inventor claims domestic priority, and which application is incorporated herein in its entirety.

BACKGROUND OF THE INVENTION

This invention relates to valve handle assemblies for manually-operated quarter-turn valves, such as plug valves and ball valves. These valves are ubiquitous in industrial settings such as manufacturing plants, refineries, chemical processing plants, oilfield operations, etc. These uses often control the flow of hazardous substances or substances which, if released, would result in the loss of valuable product or damage to property. Manually-operated quarter-turn valves have the advantage of closing and opening with limited movement required of the valve handle. In addition, the position of the valve handle immediately indicates whether the valve is open or closed. A disadvantage of these valves is that the valves can be inadvertently operated. For example, if such a valve is used to control fluids flowing through a ground level pipeline, it is possible for the handles to be kicked or tripped over by personnel. This is particularly true when the valves in the closed position, such that the handle is sticking out at a ninety degree angle from the valve body and the pipeline. Such inadvertent operation can have disastrous results.

In an effort to prevent such inadvertent operation of these types of valves, various locking mechanisms have been introduced which lock the valve in the open or closed position, such as the device disclosed in U.S. Pat. No. 5,411,048 to Massey. These types of locks generally prevent the inadvertent opening or closing of quarter-turn valves. However, once the handles have been locked in the closed position, the handles present a safety hazard to personnel walking around ground level valves or valves which are located at approximately head level. A valve handle locked in the closed position—with the valve handle sticking out perpendicular to the pipeline—creates a tripping hazard. Because the valve is locked closed, the handle will not give and thus someone accidentally walking into it will almost certainly trip. If the valves are set at head level, a locked valve handle can present a significant risk of injury from someone bumping or falling into it.

SUMMARY OF THE INVENTION

The present invention provides a solution to the problem identified above by providing a valve handle which may be folded against the body of the valve, such that little of the handle protrudes beyond the exterior housing of the valve body. The valve handle has a first member having a stem end and a first pivot end, wherein a first longitudinal axis is defined by the stem end and the first pivot end. The stem end has an aperture which is sized to engage the portion of the stem extending from the valve body. The valve handle also has a second member which has a second pivot end and a distal end, wherein a second longitudinal axis is defined by the second pivot end and the distal end. The first pivot end and the second pivot end are hingedly attached together, in end-to-end configuration, such that the second member may pivot from a first position wherein a first angle is defined between the first longitudinal axis and the second longitudinal axis, and a second position wherein a second angle is defined between the first longitudinal axis and the second longitudinal axis. The first angle is greater than 120 degrees while the second angle is less than 45 degrees. Alternatively stated, the second member may pivot from a first position in which an angle defined between the first member and the second member is obtuse and the second member is not in contact with the valve body, to a second position in which an angle defined between the first member and the second member is acute and the second member is in contact with the valve body.

The valve handle further comprises a manually operable sliding locking mechanism which maintains the second member in the first position. The manually operable sliding locking mechanism may comprises a sliding retainer member which slides along the long axis of the handle, such that the sliding retainer member concurrently overlays the first pivot end and the second pivot end, thereby preventing the second member from pivoting from the first position.

The valve body may have a first stop and a second stop which provide a limited rotation of the valve stem and valve ball or plug between a fully closed to fully open configuration. The stem end of the first member of the valve handle may have an arm which engages the first valve stop when the valve is in the fully open configuration and engages the second valve stop when the valve is in the closed position.

The manually operable sliding locking may have an engagement clip which engages and receives the second valve stop when the second member of the valve handle is in the downward or second position. This engagement of the the engagement clip with the second valve stop prevents rotation of the valve handle, and thus provides a positive lock which maintains the valve in the closed position. The engagement clip may have a pair of opposing arms having an opening defined between the pair of arms, where the second valve stop is received within the opening when the second member of the valve handle is placed in the second position.

The valve body may have a handle clip which receives a portion of the second member of the valve handle when it is placed in the second position.

DETAILED DESCRIPTION OF THE INVENTION

Figure 1:
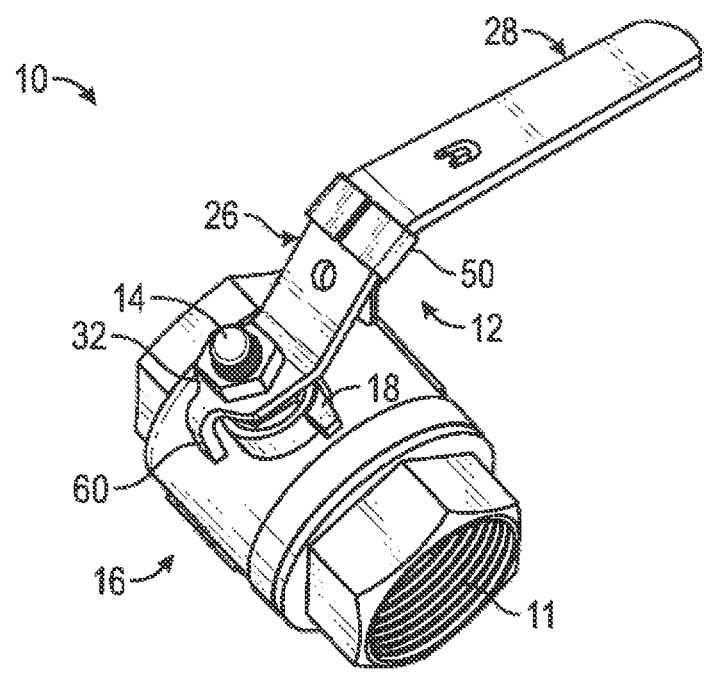
FIG. 1 is a perspective view of a manually-operated quarter-turn valve in a closed position with an embodiment of the disclosed handle in the operational position.
Figure 2:
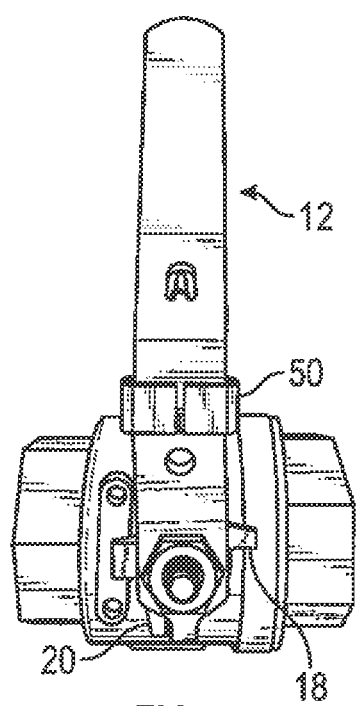
FIG. 2 is a top view of a manually-operated quarter-turn valve in a closed position with an embodiment of the disclosed handle in the operational invention.
Figure 3:
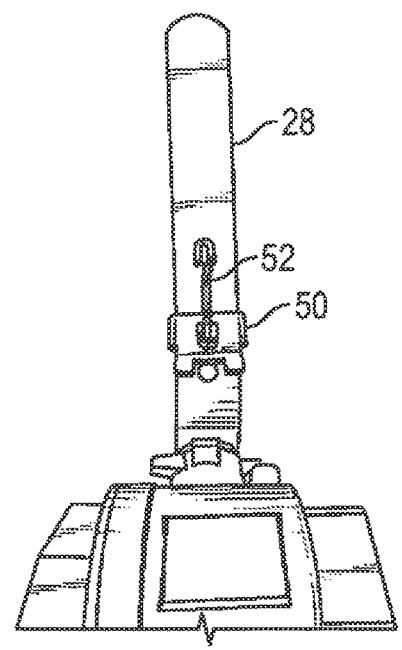
FIG. 3 is a view of the underside of an embodiment of the disclosed handle in the operational position.
Figure 4:
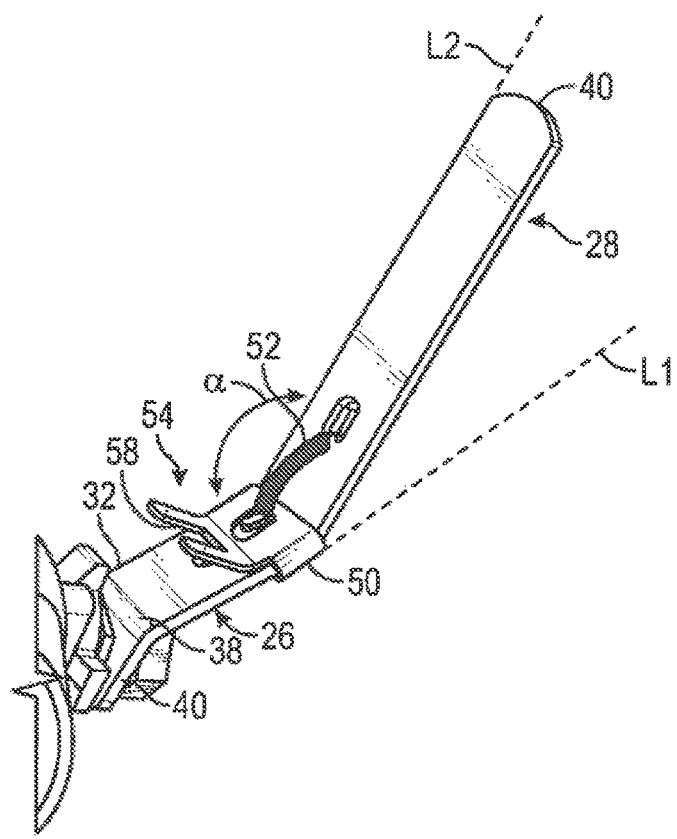
FIG. 4 is a view of the underside of an embodiment of the disclosed handle as it starts to be folded into the non-operational position.
Figure 5:
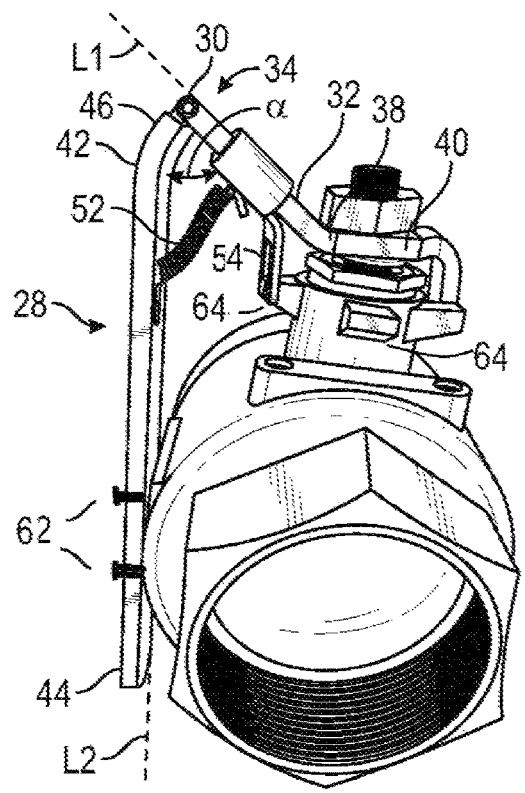
FIG. 5 is a side view of an embodiment of the disclosed handle in the non-operational position.
Figure 6:
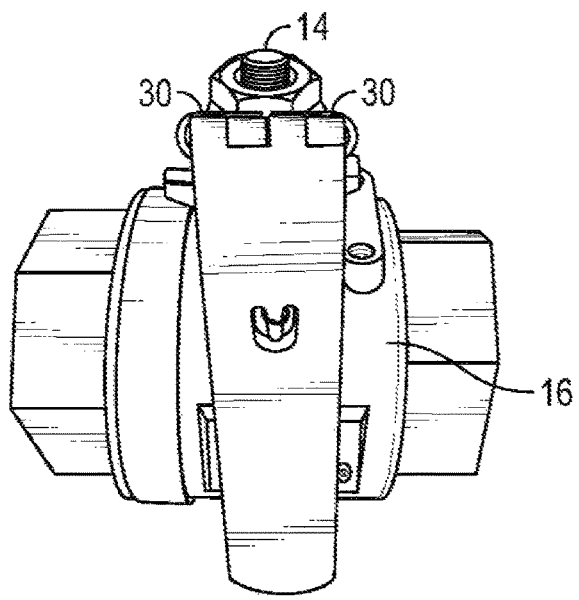
FIG. 6 is a front view of an embodiment of the disclosed handle in the non-operational position.
Figure 7:
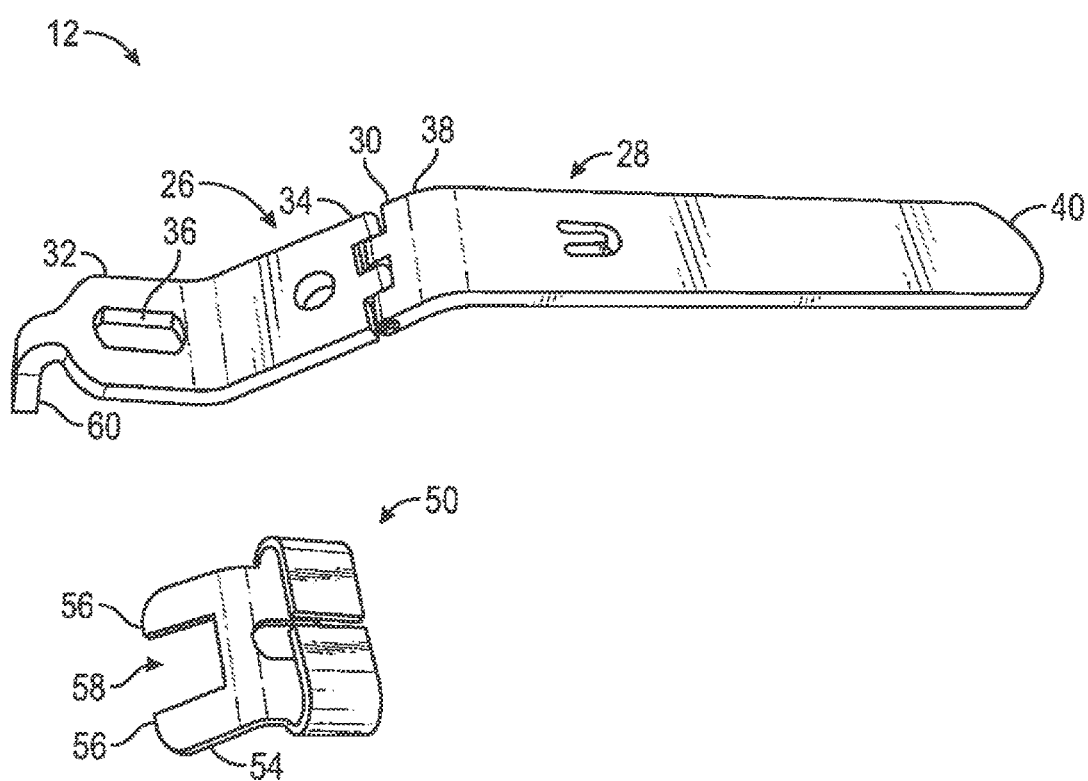
FIG. 7 shows a close up view of an embodiment of the handle detached from the quarter-turn valve.

Referring now to the figures, FIGS. 1-4 depict a manually-operated quarter-turn valve 10 in a closed position with an embodiment of the disclosed handle 12 in a first position in which the handle is fully extended. FIGS. 5-6 depict the handle 12 in a second position in which the handle 12 is folded against the valve body 16. As customary with manually-operated quarter turn valves, the valve 10 is in the open position and allowing flow when the handle 12 is in alignment with the opening 11 of the valve. All of the figures show a valve 12 in a closed position, where the handle 12 is generally perpendicular to the opening 11 of the valve.

Quarter-turn valve 10 comprises a stem 14 and a valve body 16. Valve body 16 comprises a first valve stop 18 which is engaged by a portion of handle 12 when the valve is in an open position allowing flow through the valve opening 11. Valve body 16 comprises a second valve stop 20 which is engaged by a portion of handle 12 when the valve is in a closed position with no flow going through the valve.

Valve handle 12 comprises a first member 26 hingedly attached to a second member 28 by hinge member 30 in an end-to-end configuration. As shown best in FIG. 5, the first member has such angle or curvature necessary to allow the aperture 36 to engage the valve stem 14, and to provide sufficient clearance of the first member 26 to clear the valve body 16 when the handle 12 is operated.

The first member 26 has a stem end 32 and a first pivot end 34. Stem end 32 is defined as the end of first member 26 which transitions into a first curved portion 38. However, the section of first member 26 between stem end 32 and first pivot end 34 is generally planar. A first longitudinal axis $L_1$ is defined between the stem end 32 and the first pivot end 34. Curved portion 38 transitions into aperture end 40, in which aperture 36 is placed.

Second member 28 has a second pivot end 42 and a distal end 44. A second longitudinal axis $L_2$ is defined between the second pivot end 42 and the distal end 44. As best shown in FIG. 5, second pivot end 42 of second member 28 may transition into a second curved portion 46, however the section between second pivot end 42 and distal end 44 is generally planar. A second longitudinal axis $L_2$ is defined between the second pivot end 42 and the distal end 44.

In application, second member 28 may pivot from a first position where the valve handle 12 extends outwardly for operation, such as shown in FIGS. 1-4, to a second position in which the second member 28 folds toward valve body 16, thus reducing the overall width of the valve. An angle α is defined between the relative positions of the A first longitudinal axis $L_1$ and the second longitudinal axis $L_2$ In the first position, the value of α, or the first angle, will be more than 90 degrees and thus an obtuse angle. However, in the second position the value of α, or the second angle, will be less than 90 degrees and thus an acute angle. In some embodiments, the first angle will be greater than 120 degrees and the second angle will be less than 45 degrees;

The valve handle 12 further comprises a locking mechanism, such as sliding lock 50, which slides along the long axis of the first member 26. In the locking position in which the second member 28 is in the first position, sliding lock 50 concurrently overlays hinge 30 and a portion of the first member 26 and the second member 28. The sliding lock 50 may be biased in the first position by spring 52 which is attached at one end to sliding lock 50 and at the other end to second member 28.

Sliding lock 50 may also comprise an engagement clip 54 which has a pair of opposing arms 56, wherein an opening 58 is defined between the pair of opposing arms. When second member 28 is in the second position, engagement clip 54 may slide down the length of first member 26 and receive a protrusion 64 opposite second valve stop 20. This feature provides an additional lock-out prevention which prevents the valve 10 from being inadvertently opened when the second member 28 is in the second position.

First member 26 may comprise an arm 60 at its terminus which engages first valve stop 18 when the valve is in the open position allowing flow. When the handle 12 is rotated such that the valve is in the closed position, arm 60 will engage second valve stop 20.

Valve body 16 may have a clip 62 either integral to the valve body or attached to the valve body, where the clip 62 provides a receptacle for receiving and retaining second member 28 when it is pivoted into the second position.

While the above is a description of various embodiments of the present invention, further modifications may be employed without departing from the spirit and scope of the present invention. Thus the scope of the invention should not be limited according to these factors, but according to the following appended claims:

What is claimed is:

1. A combination of a manual quarter-turn valve with a handle, the valve of the type having a valve body and a stem having a portion extending outwardly from the valve body, wherein the handle engages the portion of the stem extending from the valve body, the combination comprising:
   the handle having a first member having a stem end and a first pivot end, wherein the stem end comprises an aperture sized to engage the portion of the stem extending from the valve body;
   a second member having a second pivot end and a distal end, wherein the first pivot end and the second pivot end are hingedly attached together, wherein the second member may pivot from a first position wherein an angle between the first member and the second member is obtuse and the second member is not in contact with the valve body to a second position wherein an angle between the first member and the second member is acute and the second member is in contact with the valve body; and
   a manually operable locking mechanism which maintains the second member in the first position, wherein the manually operable locking mechanism comprises a sliding retainer member which concurrently overlays the first pivot end and the second pivot end when the second member is in the first position, thereby locking the second member in the first position;
   wherein the valve body comprises a first valve stop and a second valve stop, and the stem end of the first member comprises an arm which engages the first valve stop when the valve is in an open position and the arm engages the second valve stop when the valve is in the closed position, wherein the sliding retaining member comprises an engagement clip comprising a pair of opposing arms having an opening defined between the pair of opposing arms, wherein the opening engages and receives a protrusion opposite the second valve stop when the second member is moved into the second position, thereby locking the valve in the closed position.

2. The handle of claim 1 wherein the sliding retainer member is biased to lock the second member in the first position.

3. The handle of claim 1 wherein the valve body comprises a handle clip which receives a portion of the second member when the second member is moved to the second position.

4. A combination of a manual quarter-turn valve and a handle, the valve of the type having a valve body and a stem having a portion extending outwardly from the valve body, wherein the handle engages the portion of the stem extending from the valve body, the combination comprising:

the handle having a first member having a stem end and a first pivot end, wherein a first longitudinal axis is defined between the stem end and the first pivot end, wherein the first member comprises an aperture sized to engage the portion of the stem extending from the valve body;

a second member having a second pivot end and a distal end, wherein a second longitudinal axis is defined by the second pivot end and the distal end, wherein the first member and the second member are hingedly attached together in an end-to-end configuration, wherein the second member may pivot from a first position wherein a first angle is defined between the first longitudinal axis and the second longitudinal axis, and a second position wherein a second angle is defined between the first longitudinal axis and the second longitudinal axis, wherein the first angle is greater than 120 degrees and the second angle is less than 45 degrees; and a manually operable locking mechanism which maintains the second member in the first position, wherein the manually operable locking mechanism comprises a sliding retainer member which concurrently overlays a portion of the first member and the second member when the second member is in the first position, thereby locking the second member in the first position;

wherein the valve body comprises a first valve stop and a second valve stop, and the first member comprises an arm which engages the first valve stop when the valve is in an open position and the arm engages the second valve stop when the valve is in the closed position and the sliding retaining member comprises an engagement clip comprising a pair of opposing arms having an opening defined between the pair of opposing arms, wherein the opening engages and receives a protrusion opposite the second valve stop when the second member is moved into the second position, thereby locking the valve in the closed position.

5. The handle of claim 4 wherein the sliding retainer member is biased to lock the second member in the first position.

6. The handle of claim 1 wherein the valve body comprises a handle clip which receives a portion of the second member when the second member is moved to the second position.

\* \* \* \* \*